(12) United States Patent
Chen et al.

(10) Patent No.: US 9,619,174 B2
(45) Date of Patent: Apr. 11, 2017

(54) WRITE MECHANISM FOR STORAGE CLASS MEMORY

(75) Inventors: Feng Chen, Hillsboro, OR (US);
Michael P. Mesnier, Scappoose, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 13/992,809

(22) PCT Filed: Dec. 30, 2011

(86) PCT No.: PCT/US2011/068086
§ 371 (c)(1),
(2), (4) Date: Jun. 10, 2013

(87) PCT Pub. No.: WO2013/101179
PCT Pub. Date: Jul. 4, 2013

(65) Prior Publication Data
US 2014/0006686 A1 Jan. 2, 2014

(51) Int. Cl.
*G06F 12/02* (2006.01)
*G06F 3/06* (2006.01)
*G06F 12/14* (2006.01)
*G06F 12/1009* (2016.01)

(52) U.S. Cl.
CPC .......... *G06F 3/0656* (2013.01); *G06F 3/0611* (2013.01); *G06F 3/0679* (2013.01); *G06F 12/0246* (2013.01); *G06F 12/1433* (2013.01); *G06F 12/0238* (2013.01); *G06F 12/1009* (2013.01); *G06F 12/14* (2013.01)

(58) Field of Classification Search
CPC ............. G06F 12/0246; G06F 12/0238; G06F 12/1009; G06F 12/14; G11C 16/102
USPC ................................ 711/102, 103, 163, 206
See application file for complete search history.

(56) References Cited

U.S. PATENT DOCUMENTS

| 7,827,348 | B2 | 11/2010 | Lee | |
|---|---|---|---|---|
| 8,676,851 | B1 * | 3/2014 | Nesbit et al. | ................. 707/791 |
| 2008/0209114 | A1 | 8/2008 | Chow | |

(Continued)

FOREIGN PATENT DOCUMENTS

| CN | 101122887 A | 2/2008 |
|---|---|---|
| CN | 101399075 A | 4/2009 |
| TW | 200943060 A | 10/2009 |

OTHER PUBLICATIONS

PCT International Search Report and Written Opinion issued in corresponding PCT/US2011/068086 dated Aug. 30, 2012 (18 pages).

(Continued)

*Primary Examiner* — Than Nguyen
(74) *Attorney, Agent, or Firm* — Trop Pruner & Hu, P.C.

(57) ABSTRACT

Storage class memory may be used in an architecture to achieve high performance, high reliability, high compatibility. In some embodiments, reads may be handled in a conventional way used in a memory based model. However writes do not use a memory based model but instead correspond to a storage based model. The hybrid nature can be achieved by setting the storage class memory to be write protected so that all writes must go through a software based block device interface. In some embodiments, the software based block device interface prevents erroneous writes to the storage class memory.

27 Claims, 4 Drawing Sheets

(56) References Cited

U.S. PATENT DOCUMENTS

| | | | |
|---|---|---|---|
| 2009/0259796 A1* | 10/2009 | Awyong et al. | 711/102 |
| 2010/0223422 A1 | 9/2010 | Bonella | |
| 2010/0281211 A1* | 11/2010 | Ooigawa et al. | 711/114 |
| 2011/0307646 A1* | 12/2011 | Lee et al. | 711/103 |
| 2013/0013853 A1* | 1/2013 | Yeh | 711/103 |
| 2013/0159602 A1* | 6/2013 | Adams et al. | 711/103 |
| 2014/0181374 A1* | 6/2014 | Ellard | 711/103 |
| 2014/0208017 A1* | 7/2014 | Benhase et al. | 711/113 |

OTHER PUBLICATIONS

China Patent Office 1st office action issued in corresponding CN patent application No. 201180076140.1 dated Apr. 13, 2016 (10 pages).

China Patent Office 2nd office action issued in corresponding CN patent application No. 201180076140.1 dated Oct. 8, 2016 (11 pages).

* cited by examiner

WRITE MECHANISM FOR STORAGE CLASS MEMORY

BACKGROUND

This relates generally to storage class memory.

Storage class memory is a non-volatile memory (NVM) that includes dynamic, random access memory-like performance and storage-like non-volatility.

An example of a storage class memory is a phase change memory with an access device. Other examples include ferroelectric random access memory, magnetoresistive memory, resistive random access memory, programmable metallization cell memory, and nano-wire based charge trapping memories, to mention some examples.

Currently, there is no architecture that fully utilizes storage class non-volatile memory in a way that can achieve high performance, high reliability and high compatibility. The two incumbent architectural models for integration include a memory based model and a storage based model. In a memory based model, storage class non-volatile memory is attached to a memory controller. Although this model can achieve high performance, it provides lower reliability than the model using an input/output controller due to the possibility of stray writes from kernel code with bugs. Thus the storage class memory may be improperly written and data may be permanently lost in some cases.

In storage based models, the storage class memory is used as a disk replacement and accessed through an input/output controller such as the Peripheral Component Interconnect (PCI) Express bus or the Serial Advanced Technology Attachment (SATA). This model provides high reliability by disallowing direct access to the non-volatile memory space and it also provides high compatibility by using a disk-like interface. However, it suffers from lower performance due to the slower input/output interface.

BRIEF DESCRIPTION OF THE DRAWINGS

Some embodiments are described with respect to the following figures.

DETAILED DESCRIPTION

In accordance with some embodiments, non-volatile memory may be used in an architecture to achieve high performance, high reliability and high compatibility. Non-volatile memory may be physically managed using a memory based model for performance, and reads and writes may be handled using a storage based model for reliability and compatibility. In some embodiments, reads may be handled in a conventional way using a memory based model, though at the same cost of low compatibility. However, writes do not use a memory based model but instead correspond to a storage based model to ensure high reliability. The hybrid nature can be achieved by setting the non-volatile memory to be write protected so that all writes must go through a software based block device interface. In some embodiments, the software based block device interface prevents erroneous writes to the non-volatile memory.

In some embodiments, a write protection scheme is used that avoids some of the overhead associated with storage based models. Instead of converting from a read-only mode to a writeable mode for each write, writes are buffered in a circular buffer and then, at appropriate times, a batch of writes may be written in a continuous fashion to a non-volatile memory. Thus in some embodiments, write protection can be achieved in an efficient fashion that does not adversely significantly effect performance.

Figure 1:
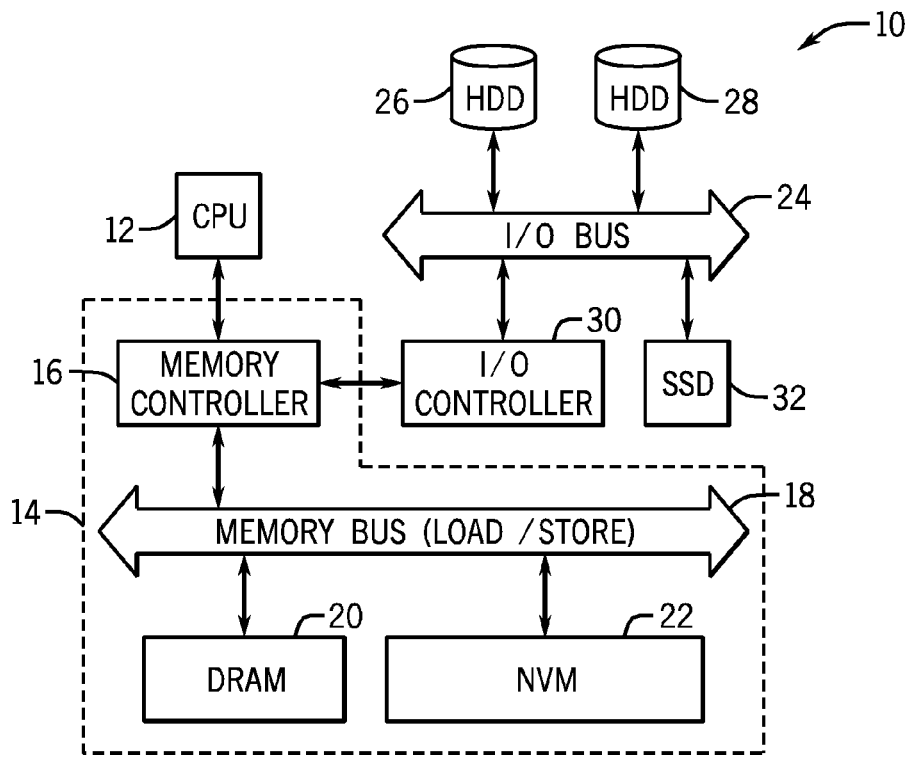
FIG. 1 is a physical depiction of one embodiment to the present invention.

Referring to FIG. 1, a system 10 may include a central processing unit 12. In some embodiments, a number of cores may be provided for the central processing unit. The central processing unit 12 is coupled to a memory device 14 that includes memory controller 16 and a memory bus 18. In some embodiments, dynamic random access memory (DRAM) 20 is connected to the memory bus, as is a non-volatile memory (NVM) 22. In some embodiments, the non-volatile memory 22 is a storage class memory.

The memory controller 16 is also coupled to an input/output controller 30 coupled through an input/output bus 24 to a hard disk drive (HDD) 26, hard disk drive 28 and a solid state device (SSD) 32. Of course other architectures are also possible and this is simply an example of a hardware architecture that on its face appears to follow the memory based model, but in fact as described hereinafter also follows the storage based model for accesses to the memory.

Figure 2:
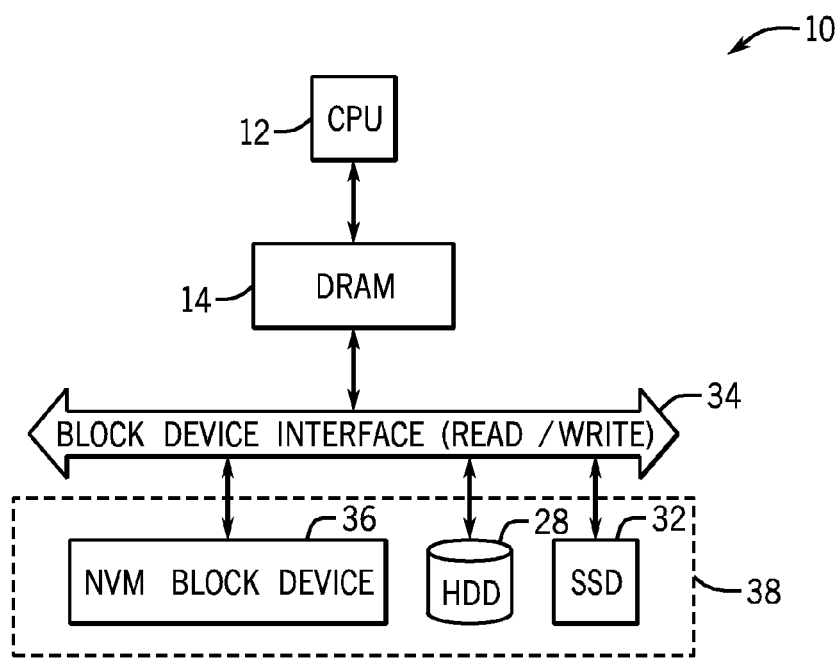
FIG. 2 is a logical depiction of the embodiment shown in FIG. 1 in accordance with one embodiment of the present invention.

Referring to FIG. 2, the logical architecture of the system 10 shown in FIG. 1 is depicted. The central processing unit 12 is coupled to the system memory 20 which is typically dynamic random access memory. The system memory is then coupled to a block device interface 34 that follows a read/write specification.

A non-volatile memory block device 36 is coupled to the device interface as are the hard disk drive 28 and the solid state device 32. Thus the storage coupled to the device interface 34 is collectively indicated by dotted block 38.

Figure 4:
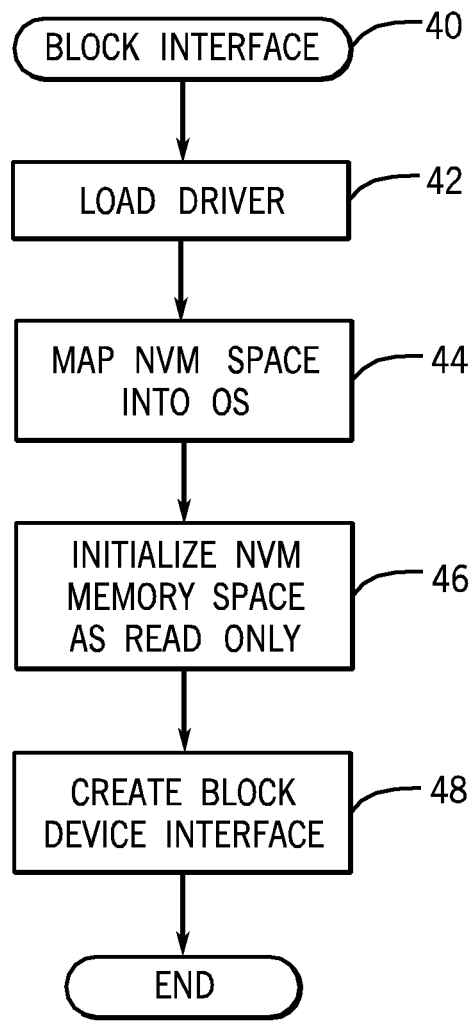
FIG. 4 is a flow chart for a block interface in accordance with one embodiment of the present invention.

Referring to FIG. 4, in order to set up the block device interface a sequence 40 may be used. The sequence may be implemented in hardware, software and/or firmware. In software and firmware embodiments it may be implemented by computer executed instructions stored in a non-transitory computer readable medium such as an optical, magnetic or semiconductor memory. In some embodiments, it may be implemented by the operating system and stored in the memory 20.

The sequence 40 may begin by loading a driver, as indicated in block 42. Then the non-volatile memory space is mapped into the operating system, as indicated in block 44. The non-volatile memory space is initialized as read-only, as indicated in block 46. Then a block device interface is created, as shown in block 48. As a result, the non-volatile memory 22 may be accessed using the storage-based model (or memory based model) for reads but is accessed using the storage based model for writes and, as will be described hereinafter, a write protection mechanism may also be overlaid in some embodiments.

Figure 3:
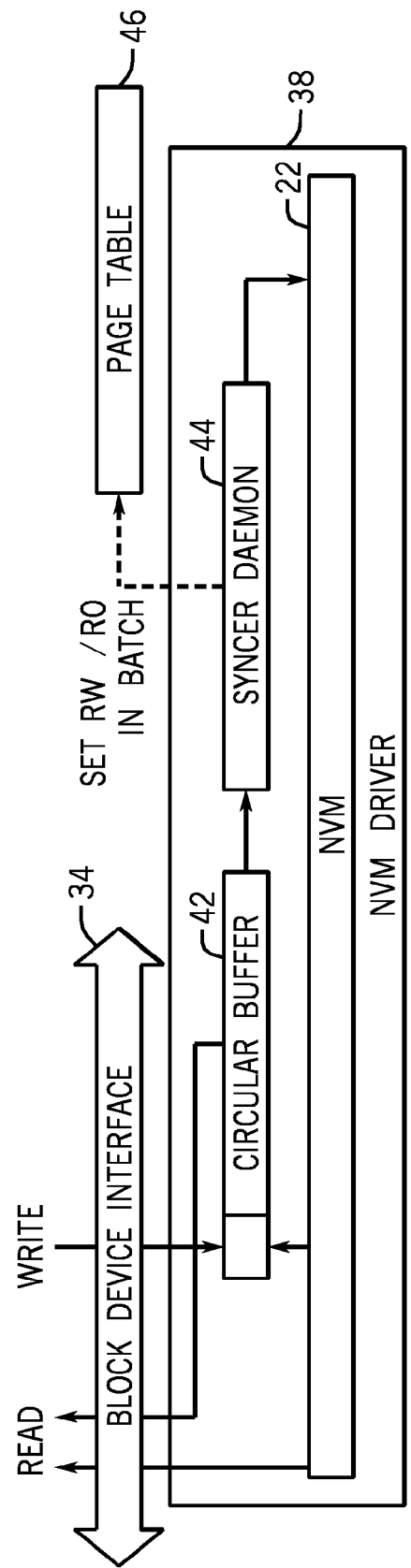
FIG. 3 is a write protection architecture according to one embodiment of the present invention.

Referring to FIG. 3, the architecture of the write protection mechanism is indicated. As indicated, writes go through the block device interface 34, but instead of going directly to the non-volatile memory 22, they are intercepted by the circular buffer 42. The circular buffer 42 buffers a series of writes. Syncerdaemon 44 monitors the circular buffer 42 on a periodic basis in one embodiment.

When the circular buffer 42 is sufficiently full in some embodiments, the syncerdaemon 44 may flush the circular buffer 42 to the non-volatile memory. It does this by resetting the appropriate page table from read-only to writable. Because the syncerdaemon 44 may reorganize the blocks in the circular buffer 42, blocks that are contiguous may be located and written, in a batch write, to the non-volatile memory, all in one write sequence. Thus it is not necessary to change write access from read-only to writable for every write request, but, instead, writing can be done in batches using the circular buffer 42.

A batch of writes may be written in a continuous fashion to the non-volatile memory, and the mode changes (between read-only and writable) to the page table may also be performed in batch. So the data is flushed to the non-volatile space, but the page table needs to be changed to enable the write. Both may happen in a batch. For each page in the non-volatile memory space, there is a corresponding entry in the page table. Each page table entry has a bit that controls whether this page is read-only or writable. We initialize the bit for all the non-volatile memory pages to read-only. Before writing a page, we switch the bit of the corresponding page from read-only to writable, write the page, and then switch the bit back to read-only. It is slow to perform such bit switch operations page by page. Thus, we can batch a bunch of contiguous pages and do the switch once, which amortizes the overhead.

The syncerdaemon 44 may also flush to the non-volatile memory during idle periods. Idle periods can be detected by checking time stamps associated with memory space accesses. When there has been no memory access within a given period of time, the syncerdaemon may go ahead and flush the circular buffer to the non-volatile memory.

Figure 5:
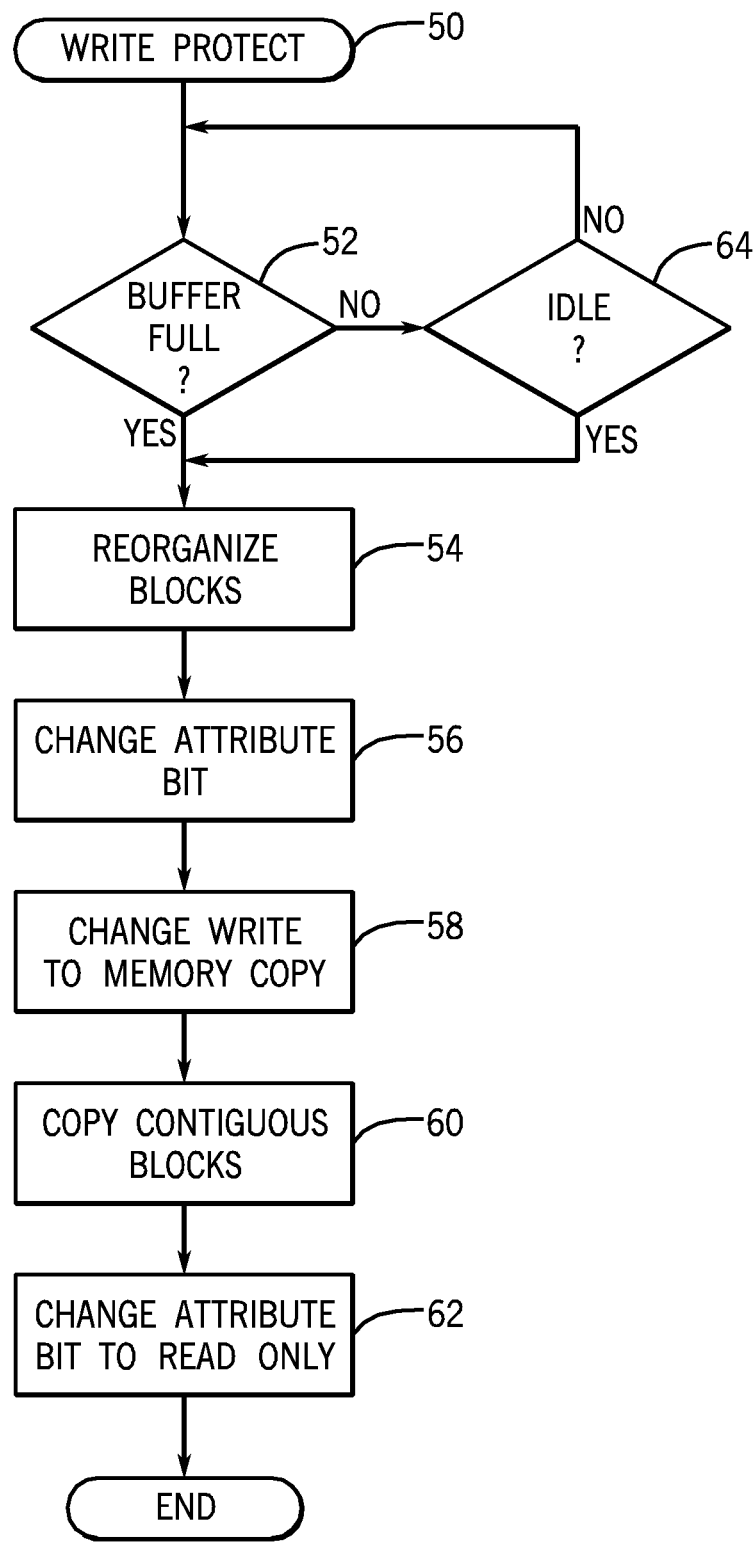
FIG. 5 is a flow chart for a write protection mechanism according to one embodiment of the present invention.

Referring now to FIG. 5, a write protection sequence 50 may be implemented in software, hardware, and/or firmware. In software and firmware embodiments, it may be implemented as computer executed instructions stored in a non-transitory computer readable medium such as a magnetic, semiconductor or optical storage. In some embodiments, the write protection mechanism may be implemented by the memory controller 16 and in particular may be implemented in hardware within the memory controller or in software stored in the appropriate storage device with the memory controller 16. Of course the write protection mechanism can be implemented in other locations within the system 10 as well.

The syncerdaemon periodically checks (diamond 52) whether the circular buffer is full. If so, it reorganizes the blocks (block 54) within the circular buffer 42 to attempt to find a contiguous series of blocks that can be written as a chunk to the non-volatile memory. Once it has the blocks reorganized, the attribute bits may be changed from read-only to writable in the particular page table 46. Then contiguous blocks may be written as indicated in block 56.

Next, the write is converted into a memory copy, in some embodiments, as indicated in block 58. The data is copied from the circular buffer to the non-volatile memory in contiguous blocks (to the extent possible) as indicated in block 60. Finally the attribute bits in the particular page table are changed back to read-only after the write is completed (block 62).

In some embodiments the number of times that the syncer daemon must change from writable to read-only and from read-only to writable may be reduced. This may improve performance because of the overhead associated with such conversions.

The block device interface is a logical interface in operating systems that may be used for accessing files. Initially, a file is open and registered in the operating system. Kernel application program interface (API) procedures in the operating system may then be used to read or write. The API procedures may transfer the data via the block device interface from or to the physical locations of the file in storage. Finally, the file is closed.

In some embodiments, multiple syncers 44 and buffers 42 may be used to further improve performance.

In one embodiment, where the non-volatile memory 22 is a phase change memory, an array of threshold-switch memory cells may be formed along address lines which may be called row lines, coupled to a row decode circuit. The cells may also be coupled to a column decode circuit via address lines which may be called column lines.

Each cell may include a stable chalcogenide material in one embodiment. In one embodiment, the chalcogenide material may be one which is generally in its amorphous phase and in operation does not change to a crystalline phase. More specifically, when exposed to 200° C. for thirty minutes or less, the chalcogenide material does not change phases, such as to a low resistance state. An Ovonic Unified Memory (OUM), such as Ge2Sb2Te5 (GST), changes phase under these conditions.

A select or threshold device is an Ovonic Threshold Switch ("OTS") that can be made of an alloy of chalcogenide that does not switch from an amorphous to a crystalline phase and which undergoes a rapid, electric field initiated change in conductivity, a change in conductivity that persists only so long as a holding current through the device is present. Instead, through the application of appropriate programming pulses, the threshold voltage of the cell may be altered. These altered threshold voltage cells may then be detected as being in one or the other of at least two programmable states based on their threshold voltage. For added memory margin, a threshold-switch memory cell may be combined in series with an "OUM" (Ovonic Unified Memory) device or other alloy which changes phases from a low resistance to a high resistance phase and has a corresponding threshold difference between those phases.

As an example, for a 0.5 micrometer diameter device formed of TeAsGeSSe having respective atomic percents of 16/13/15/1/55, the holding current may be on the order of 0.1 to 1 micro-amps (uA) in one embodiment. Below this holding current, the device turns off and returns to the high resistance regime at low voltage, low field applied. The threshold current for the device may generally be of the same order as the holding current. The holding current may be altered by changing process variables, such as the top and bottom electrode material and the chalcogenide material, and/or the contact area between the electrodes and chalcogenide. The device may provide high "on current" for a given area of device, such as compared to conventional access devices such as metal oxide semiconductor field effect transistors or bipolar junction transistors or semiconductor diodes.

Programming to alter the state or phase of a phase change material may be accomplished by applying voltage potentials to the electrodes sandwiching the material forming the memory element thereby generating a voltage potential across a memory element including a phase change material. When the voltage potential is greater than the threshold voltages of the select device and storage element, then an electrical current may flow through the storage element in response to the applied voltage potentials, and may result in heating of the storage element.

This heating may alter the memory state or phase of the element, in one embodiment. Altering the phase or state of the element may alter the electrical characteristic of memory material, e.g., the resistance of the material may be altered by altering the phase of the memory material.

In the "reset" state, the storage element may be in an amorphous or semi-amorphous state and in the "set" state, memory material may be in a crystalline or semi-crystalline state. The resistance of the storage element in the amorphous or semi-amorphous state may be greater than the resistance of memory material in the crystalline or semi-crystalline state. It is to be appreciated that the association of reset and set with amorphous and crystalline states, respectively, is a convention and that at least an opposite convention may be adopted.

Using electrical current, the storage element may be heated to a relatively higher temperature to amorphosize memory material and "reset" memory material (e.g., program memory material to a logic "0" value). Heating the volume of memory material to a relatively lower crystallization temperature may crystallize memory material and "set" memory material (e.g., program memory material to a logic "1" value). Various resistances of memory material may be achieved to store information by varying the amount of current flow and duration through the volume of memory material.

Other non-volatile memory technologies, called storage class memories, that may be used including so-called ferroelectric polymer memories, magnetorestrictive random access memory, programmable metallization cell, resistive random access memory, and nanowire-based charge trapping memory devices, to mention a few examples.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   setting a page in storage class memory to read only by setting a page table entry bit;
   changing the page in the storage class memory to be writable for a batch of memory writes by resetting the page table entry bit;
   writing to said storage class memory using a storage based model using an input/output controller to set or reset the bit, said interface to prevent erroneous writes to said storage class memory; and
   protecting said memory by writing to a buffer and transferring a batch of data in said buffer to said memory.

2. The method of claim 1 including reorganizing blocks in said buffer to enable said blocks to be written as a group to said memory.

3. The method of claim 2 including reorganizing to identify contiguous blocks.

4. The method of claim 1 including changing said memory to writeable before writing from said buffer.

5. The method of claim 4 including changing said memory to read only after writing to said memory.

6. The method of claim 1 including writing to a storage class memory including phase change memory.

7. The method of claim 1 including detecting an idle period and in response writing to said memory.

8. The method of claim 1 including writing to said memory when said buffer is full.

9. The method of claim 1 wherein transferring includes using a memory copy.

10. A non-transitory computer readable medium storing instructions executed by a controller to:
    set a page in storage class memory to read only by setting a page table entry bit;
    change the page in the storage class memory to be writable for a batch of memory writes by resetting the page table entry bit;
    write to said storage class memory using a storage based model using an input/output controller to set or reset the bit, said interface to prevent erroneous writes to said storage class memory; and
    protect said memory by writing to a buffer and transferring a batch of data in said buffer to said memory.

11. The medium of claim 10 further storing instructions to reorganize blocks in said buffer to enable said blocks to be written as a group to said memory.

12. The medium of claim 11 further storing instructions to reorganize to identify contiguous blocks.

13. The medium of claim 10 further storing instructions to change said memory to writeable before writing from said buffer.

14. The medium of claim 13 further storing instructions to change said memory to read only after writing to said memory.

15. The medium of claim 10 further storing instructions to write to a storage class memory including phase change memory.

16. The medium of claim 10 further storing instructions to detect an idle period and in response writing to said memory.

17. The medium of claim 10 further storing instructions to write to said memory when said buffer is full.

18. The medium of claim 10 further storing instructions to transfer using a memory copy.

19. An apparatus comprising:
    a storage class memory;
    an input/output controller coupled to said memory;
    a processor, coupled to said memory controller, to set a page in storage class memory to read only by setting a page table entry bit, change the page in the storage class memory to be writable for a batch of memory writes by resetting the page table entry bit, and write to said storage class memory using a storage based model using the input/output controller to set or reset the bit, said interface to prevent erroneous writes to said storage class memory said processor to protect said memory by writing to a buffer and transferring a batch of data in said buffer to said memory.

20. The apparatus of claim 19, said processor to reorganize blocks in said buffer to enable said blocks to be written as a group to said memory.

21. The apparatus of claim 20, said processor to reorganize to identify contiguous blocks.

22. The apparatus of claim 19, said processor to change said memory to writeable before writing from said buffer.

23. The apparatus of claim 22, said processor to change said memory to read only after writing to said memory.

24. The apparatus of claim 19, wherein said memory is a phase change memory.

25. The apparatus of claim 19, said processor to detect an idle period and in response writing to said memory.

26. The apparatus of claim 19, said processor to write to said memory when said buffer is full.

27. The apparatus of claim 19, said processor to transfer using a memory copy.

* * * * *